(12) United States Patent
Miazzo et al.

(10) Patent No.: US 8,806,659 B1
(45) Date of Patent: Aug. 12, 2014

(54) SECURE REMOTE CONTENT ACTIVATION AND UNLOCKING

(75) Inventors: Valentino Miazzo, Macherio (IT); Gregory Maertens, Milan (IT); Alexandre Vernhet, Saint Clement de Riviere (FR); Davide Maestroni, Lainate (IT); Babak Saffari, San Carlos, CA (US)

(73) Assignee: Rambus Inc., Sunnyvale, CA (US)

( * ) Notice: Subject to any disclaimer, the term of this patent is extended or adjusted under 35 U.S.C. 154(b) by 780 days.

(21) Appl. No.: 12/471,161

(22) Filed: May 22, 2009

Related U.S. Application Data

(60) Provisional application No. 61/055,212, filed on May 22, 2008.

(51) Int. Cl.
*G06F 7/04* (2006.01)

(52) U.S. Cl.
USPC ................................ 726/30; 726/32; 726/33

(58) Field of Classification Search
USPC ............................................... 726/30, 32–33
See application file for complete search history.

(56) References Cited

U.S. PATENT DOCUMENTS

| | | | |
|---|---|---|---|
| 7,702,592 B2* | 4/2010 | Taylor | 705/71 |
| 8,543,785 B2* | 9/2013 | Clinick et al. | 711/163 |
| 2005/0002296 A1* | 1/2005 | Lee | 369/47.21 |
| 2006/0104194 A1* | 5/2006 | Ota et al. | 369/275.4 |
| 2007/0033419 A1* | 2/2007 | Kocher et al. | 713/193 |
| 2007/0078777 A1* | 4/2007 | Demartini et al. | 705/59 |
| 2008/0028170 A1* | 1/2008 | Clinick et al. | 711/162 |
| 2008/0063194 A1* | 3/2008 | Takashima et al. | 380/200 |
| 2008/0137848 A1* | 6/2008 | Kocher et al. | 380/201 |
| 2008/0313270 A1* | 12/2008 | Clinick et al. | 709/203 |
| 2009/0327710 A1* | 12/2009 | Yoshizawa | 713/162 |

OTHER PUBLICATIONS

"Profiling MPEG Rights Expression Language: Concept, Approach and Applications", 2003, ContentGuard Inc., all pages, http://www.xrml.org/reference/MPEG-REL-Profiling.pdf.*
Wang et. al., "The MPEG-21 Rights Expression Language and Rights Data Dictionary", Jun. 2005, IEEE Transactions on Multimedia, vol. 7, No. 3, all pages, http://ieeexplore.ieee.org/stamp/stamp.jsp?tp=&arnumber=1430716.*
"DRM Rights Expression Language Approved Version 2.0", Mar. 3, 2006, Open Mobile Alliance (OMA) all pages, http://www.omadrm.ru/spec/version2/DRM%20REL.pdf.*
Advanced Access Content System (AACS) Pre-recorded Video Book, Revision 0.91, Feb. 17, 2006, all pages. Retrived from http://www.aacsla.com/home.*
Advanced Access Content Systems (AACS) Introduction and Common Cryptographic Elements, Revision 0.91, Feb. 17, 2006, all pages, Retrieved from http://www.aacsla.com/home.*

* cited by examiner

*Primary Examiner* — Calvin Cheung
(74) *Attorney, Agent, or Firm* — The Neudeck Law Firm, LLC

(57) ABSTRACT

Systems and methods are provided to enable secure remote activation and/or unlocking of content or other media assets protected using one or more copy protection mechanisms or techniques. Existing trusted processor architectures used by electronic devices (e.g., HD-DVD or Blu-Ray optical disc readers) can be used to allow remote activation and/or unlocking of protected content. An authorization server is configured to identify the specific copy of the protected content or other media assets at the device from the request, and determine the correct correlation between the request and information that enables the device to initiate playback of the protected content. Accordingly, the authorization server maintains secret or private on the authorization server the information that can be used by other parties to obtain a correlation between the request and any response received from the authorization server that enable the device to initiate playback of the protected content.

20 Claims, 9 Drawing Sheets

SECURE REMOTE CONTENT ACTIVATION AND UNLOCKING

CROSS-REFERENCES TO RELATED APPLICATIONS

This application claims priority to and the benefit of U.S. Provisional Patent Application No. 61/055,212, filed May 22, 2008, the entire disclosure of which is herein incorporated by reference for all purposes.

BACKGROUND OF THE INVENTION

Content provided on High-Definition (HD) Digital Video/Versatile Discs (DVD), with either Blu-ray or HD-DVD standards technologies, brings many more features than just a better visual experience. Among these features can include enhanced copy protection, such the Advanced Access Content System (AACS). AACS is a standard for content distribution and digital rights management (DRM), intended to restrict access to and copying of the content found on the next generation of optical discs and DVDs and high-definition media.

Since around 2006 when devices began including the functionality to play back content protected using enhanced copy protection mechanisms, such as AACS, "hackers" ranging from enthusiastic home computer hobbyists to malicious users using advanced techniques on personal computers (PCs), in particular, have been able to retrieve decryption keys used to protect the content. In general, these hackers take advantage of a PC software players' weaknesses to exploit the enhanced copy protection mechanisms. As a result, AACS decryption keys in particular have been extracted from weakly protected PC software players. These decryption keys have further been published around the Internet for use by others. While measures may be taken to revoke the corrupted or exposed decryption keys, it is usually only a matter of time before new keys are exposed or corrupted using the same techniques.

Most copy protection mechanisms propose having a trusted processor. The trusted processor can forbid or otherwise disallow unauthorized applications or even the user from accessing memory in the clear that would expose decrypted data that is otherwise stored as encrypted data. Recently, most if not all consumer electronic devices that include these enhanced copy protection mechanisms, such as those that play AACS protected content, incorporate some form of trusted processor architecture. Yet, trusted processor architectures may not be able to prevent applications or users from accessing data once the data has left a device, such as when the device requests authorization from a remote server to locally access protected content. Additionally, extending existing trusted processor architectures can increase the complexity of a device, and thus can also increase the cost of consumer electronics.

Accordingly, what is desired are improved methods and apparatus for secure remote content activation and/or unlocking that solves at least some of the problems discussed herein of prior solutions. Additionally, what is desired are improved methods and apparatus for reducing at least some of the drawbacks discussed herein of prior solutions.

BRIEF SUMMARY OF THE INVENTION

In various embodiments, systems and methods are provided to enable secure remote activation and/or unlocking of content or other media assets protected using one or more copy protection mechanisms or techniques. In various embodiments, existing trusted processor architectures used by electronic devices (e.g., HD-DVD or Blu-Ray optical disc readers) can be augmented to allow remote activation and/or unlocking of protected content. An electronic device may be configured to generate and send a request to an authorization server requesting access to the protected content or other media assets without divulging information through the request that can be used by anyone other party than a designated party to obtain a correlation between the request and any response received from the authorization server that enable the device to initiate playback of the protected content. The authorization server is configured to identify the specific copy of the protected content or other media assets at the device from the request, and determine the correct correlation between the request and information that enables the device to initiate playback of the protected content. Accordingly, in various embodiments, the authorization server is configured to maintain secret or private on the authorization server the information that can be used by other parties to obtain a correlation between the request and any response received from the authorization server that enable the device to initiate playback of the protected content thereby reducing or substantially eliminating the likelihood of unauthorized access to the protected content.

In one embodiment, an authorization server may obtain or otherwise determine an identifier, such as a Pre-recorded Media Serial Number employed by AASC, bound to a specific copy of the protected content or other media assets and, based on a correlation maintained or held at the authorization server, information that enables electronic devices or content readers to unlock the protected content. The authorization server then may forward this unlocking information to a requesting device without divulging to anyone other party how to obtain the specific correlation between what is sent from the requesting device and any response sent from the authorization server that enables the requesting device to initiate playback of the protected content. The requesting device may then access the content as usual using the unlocking information. Thus, in some embodiments, it is more difficulty to find a correlation between the specific copy of the content or other media asset and the unlocking information for the copy without the information held secret at the authorization server.

In some embodiments, the correlation between an electronic device's request to unlock content or other media assets and the identifier bound to the specific copy of the content or other media assets may be determined at the authorization server in response to at least a portion of the identifier found within the request. The authorization server may determine non-algorithmically the correlation between the request and the identifier bound to the copy of the content or other media assets, for example, using a lookup table. In one embodiment, the authorization server may determine the correlation between the request and the identifier bound to the copy of the content or other media assets using a number of bits associated with identifier that substantially reduces or otherwise alters the likelihood of success of a brute force attack or other attack on the authentication process.

In various embodiments, the authorization server may encrypt the unlocking information at the authorization server using an encryption key associated with the authorization server. The encrypted information can further remove exposure of any correlation between the information sent to the authorization server requesting access to content and the information returned from the authorization server. In further embodiments, a determination may be performed whether the information for unlocking the content is valid. If the information for unlocking the content is not valid, a delay value may be calculated using an exponential function. One or more requests from the content reader to obtain information for unlocking the content may be delayed based on the delay value.

A further understanding of the nature and the advantages of the inventions disclosed herein may be realized by reference to the remaining portions of the specification and the accompanying drawings.

BRIEF DESCRIPTION OF THE DRAWINGS

In order to better illustrate and describe examples and/or embodiments of those inventions found within the present disclosure, reference may be made to the accompanying drawings. The additional details used to describe the accompanying drawings should not be considered as limitations to the scope of any of the disclosed inventions, the presently described examples and/or embodiments of the inventions, and/or the presently understood best mode of the inventions.

DETAILED DESCRIPTION OF THE INVENTION

In the world of distribution, providers of content or other media assets, such as music, audio books, videos, movies, or the like, may desire to distribute the content digitally in a variety of formats and targeted to a variety of devices. For example, content providers may distribute digital content in physical format, such as using CDs, DVDs, or flash memory devices. Content providers may also allow digital content to be distributed electronically over communications networks, such as being downloaded from websites or other digital media distribution services.

Digital content can be distributed in universally readable or accepted formats or standards or in proprietary formats. Containers of digital content may further include restrictions on how the digital content may be consumed or otherwise played, where the digital content may be played, when the digital content may be played, or the like. Digital content may also be encrypted before or during distribution, and subsequently decrypted for use by a user or device.

Figure 1:
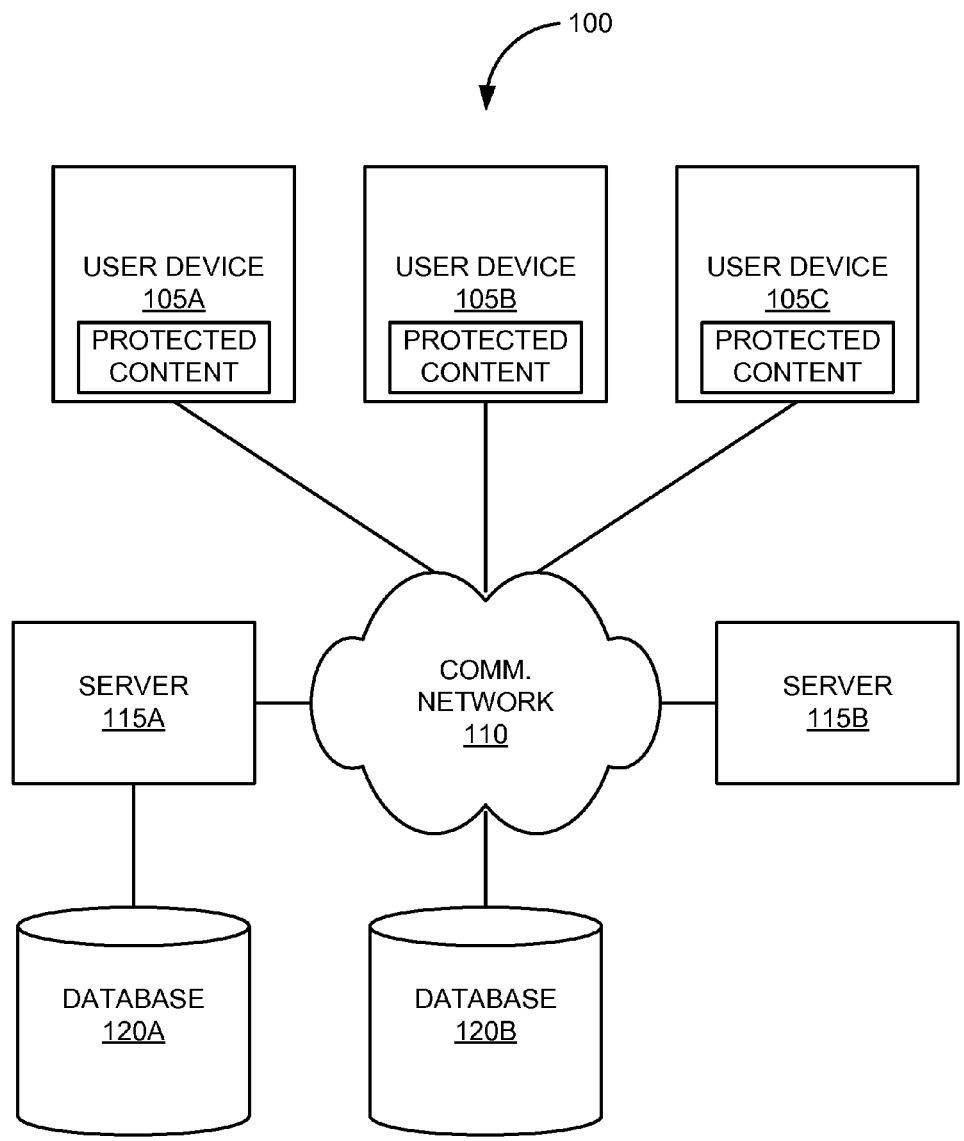
FIG. 1 is a simplified illustration of a system that may incorporate an embodiment of the present invention for secure remote content activation and unlocking.

FIG. 1 is a simplified illustration of system 100 that may incorporate an embodiment of the present invention for secure remote content activation and unlocking FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user devices 105 (e.g., user devices 105A, 105B, and 105C). User devices 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user devices 105 can also have any of a variety of applications, including one or more applications configured to perform methods of the invention, as well as one or more office applications, database client and/or server applications, and web browser applications.

Alternatively, user devices 105 can be any other electronic device, such as a thin-client computer, Internet-enabled mobile telephone, a gaming device, a DVD or Blu-Ray disc player, and/or a personal digital assistant, capable of communicating via a network (e.g., communications network 110 described below), and/or displaying multimedia content, and/or navigating web pages or other types of electronic documents. Although the exemplary system 100 is shown with three user devices, any number of user computers or devices can be supported.

Certain embodiments of the invention operate in a networked environment, which can include communications network 110. Communications network 110 can be any type of network familiar to those skilled in the art that can support data communications using any of a variety of commercially-available protocols, including without limitation TCP/IP, SNA, IPX, AppleTalk, and the like. Merely by way of example, communications network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., computers 115A and 115B). Each of server computers 115 may be configured with an operating system including without limitation any of those discussed above, as well as any commercially-available server operating systems. Each of server computers 115 may also be running one or more applications, which can be configured to provide services to one or more clients (e.g., user devices 105) and/or other servers (e.g., server computers 115).

Merely by way of example, one of server computers 115 may be a web server, which can be used, merely by way of example, to process requests for web pages or other electronic documents from user devices 105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user devices 105 to perform methods of the invention.

Server computers 115, in some embodiments, might include one or more file and or/application servers, which can include one or more applications accessible by a client running on one or more of user devices 105 and/or other server computers 115. Merely by way of example, one or more of server computers 115 can be one or more general purpose computers capable of executing programs or scripts in response to user devices 105 and/or other server computers 115, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user devices 105 and/or another of server computer 115.

In some embodiments, an application server can generate information dynamically for secure remote content activation and unlocking in accordance with embodiments of the invention. Data provided by an application server may be formatted (comprising HTML, XML, Javascript, AJAX, etc., for example) and/or may be forwarded to one of user devices 105 via a web server (as described above, for example). Similarly, a web server might receive requests and/or input data from one of user devices 105 and/or forward the requests and/or input data to an application server.

In accordance with further embodiments, one or more of server computers 115 can function as a content server and/or can include one or more of the files necessary to implement methods of the invention incorporated by an application running on one of user devices 105 and/or another of servers 115. Alternatively, as those skilled in the art will appreciate, a content server can include all necessary files, allowing such an application to be invoked remotely by one or more of user devices 105 and/or server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120A and 120B). The location of the database(s) 120 is discretionary: merely by way of example, database 120A might reside on a storage medium local to (and/or resident in) server computer 115A (and/or one or more of user devices 105). Alternatively, database 120B can be remote from any or all of user devices 105 and server computers 115, so long as it can be in communication (e.g., via communications network 110) with one or more of these. In a particular set of embodiments, databases 120 can reside in a storage-area network ("SAN") familiar to those skilled in the art. (Likewise, any necessary files for performing the functions attributed to user devices 105 and server computers 115 can be stored locally on the respective computer and/or remotely, as appropriate). In one set of embodiments, one or more of databases 120 can be a relational database that is adapted to store, update, and retrieve data in response to SQL-formatted commands. Databases 120 might be controlled and/or maintained by a database server, as described above, for example.

Figure 2:
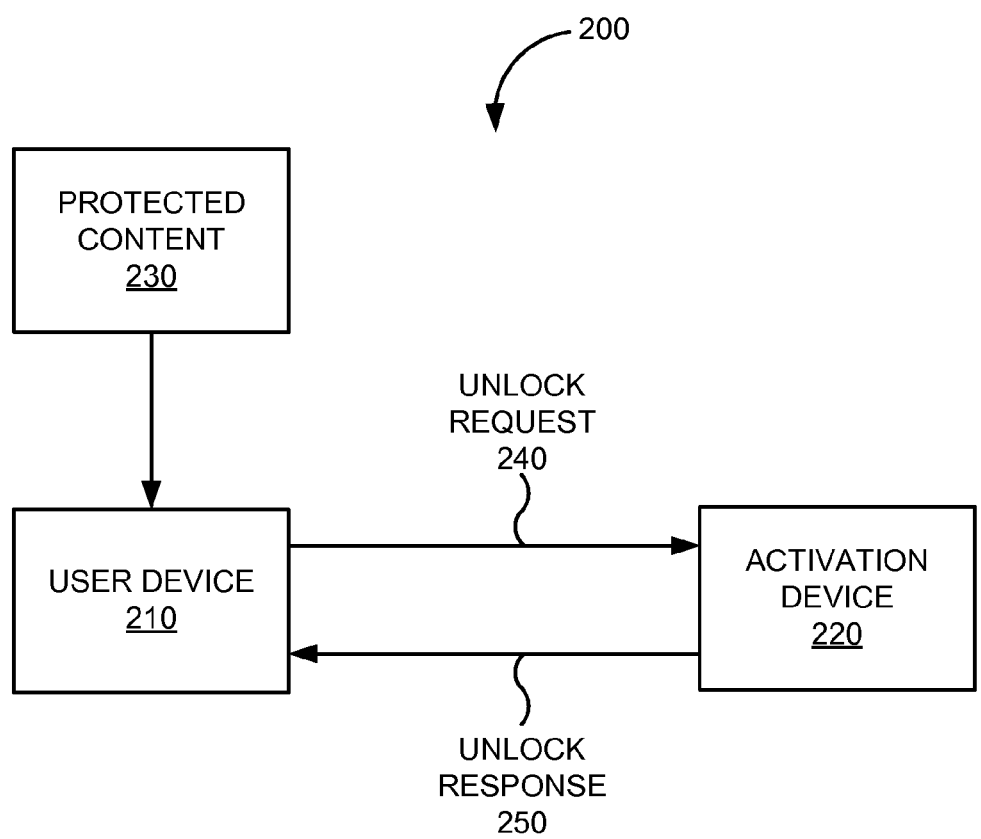
FIG. 2 is a block diagram of a system for providing unlocking of content in one embodiment according to the present invention.

FIG. 2 is a block diagram of system 200 for providing unlocking of content in one embodiment according to the present invention. System 200 can include user device 210 and activation device 220. In general, user device 210 can include hardware and/or software elements configured to play or otherwise output content. User device 210 may be embodied as one of user devices 105 of FIG. 1. Some examples of user device 210 may include consumer electronic devices, optical disc players, digital video recorders (DVRs), satellite/cable tuners, personal computers, laptops, workstations, mainframes, servers, tablet PCs, mobile PCs, game consoles, personal digital assistants (PDAs), smartphones, cell phones, or the like.

Activation device 210 can include hardware and/or software elements configured to enable user device 210 to access protected content (e.g., protected content 230) through secure remote content activation and unlocking Activation device 210 may be embodied as one of server computers 115 of FIG. 1. In some embodiments, activation device 210 may be embodied within user device 210. Some examples of activation device 220 may include consumer electronic devices, optical disc players, digital video recorders (DVRs), satellite/cable tuners, personal computers, laptops, workstations, mainframes, servers, tablet PCs, mobile PCs, game consoles, personal digital assistants (PDAs), smartphones, cell phones, or the like.

In one example of operation of system 200, to enable access to protected content, for example, user device 210 may receive protected content 230 for playback. Protected content 230 may include content or other media assets, such as textual information, audio information, image information, videos, movies, multimedia information, or the like, as well as hardware and/or software elements configured to protect access to the content or other media assets. Without proper access, information, or authorization, a user or device may not be able to initiate playback or otherwise access all or a portion of the content or other media assets associated with protected content 230. Protected content 230 may further include one or more mechanisms to implement tamper resistances, intrusion detection, or to employ a digital restrictions/rights management (DRM) scheme, watermarks, encryption/decryption, or the like. Protected content 230 may be distributed in any number of human or machine-readable formats, containers, or physical media.

Continuing the previous example, user device 210 may generate information (e.g., unlock request 240) requesting remote content activation and/or unlocking. Unlock request 240 can include information requesting access to all or a potion of protected content 230 from activation device 220. In one example, unlock request 230 may include information that identifies protected content 230. For example, unlock request 240 may include a content identifier, a title identifier, a virtual or physical volume identifier, a format or container identifier, DRM or encryption schemes, or the like. Unlock request 240 may further include information associated with user device 210. For example, unlock request 240 may include a device identifier, device information, device profiles, firmware information, software and/or hardware information, user identifier, user profiles, user preferences, or the like.

User device 210 may communicate unlock request 240 to activation device 220 on behalf of one or more users or other devices in an attempt to obtain one or more levels of access to all or a portion of protected content 230. Unlock request 240 can be sent or transmitted using a variety of mechanisms. For example, unlock request 240 may be sent via an electronic connection, a system bus, a communications bus, or the like. Unlock request 240 may further be sent or shared using a communications network, such as the Internet. Unlock request 240 may be shared via telephone service or automated interactive phone response system. Unlock request 240 may also be shared using a Universal Serial Bus (USB) key or fob, non-volatile or flash memory device, a smartcard, or the like.

Based on unlock request 240, activation device 220 may generate information (e.g., unlock response 250) that enables user device 210 to determine whether remote content activation and/or unlocking has occurred at activation device 220. Unlock response 250 may include information that enables user device 210 to access the requested portion of protected content 230. In one example, activation device 220 may further generate information that indicates to user device 210 one or levels of access to a requested portion of protected content 230. Unlock response 250 may include encryption/decryption keys, authorization codes, or other information allowing user device 210 to access all or a portion of protected content 230.

Based on receiving information indicating remote content activation and/or unlocking via unlock response 250, user device 210 can initiate playback of the content or other media assets associated with protected content 230. User device 210 may initiate playback of the content or other media assets with full access, partial access, time-based access, use-based access, or the like.

In various embodiments, system 200 can provide remote content activation and/or unlocking of content protected using one or more pre-existing copy protection mechanisms, such as AACS. System 200 may incorporate remote content activation and/or unlocking using AACS automatically via the Internet, or other communications networks, or by using manual mechanisms, such as asking the user to get an access code from a web site, calling a 1-800 number, or the like. In conjunction with AACS, system 200 can provide a more secure activation and/or unlocking of a content title stored on a disc (e.g., protected content 230) for access by a (HD) DVD player (e.g., user device 210) after remote activation and/or unlocking from a remote server (e.g., activation device 220).

Typically, the AACS authorization process causes one or more piece of information associated with the disc's title to be sent to an authorization server. For example, the following information may be sent from a user's disc player to enable playback of movie content stored on an AACS protected disc:
  Title ID: the title one wants to unlock
  Volume ID: the volume (or disc) to which the title belongs
  Pre-recorded Media Serial Number (PMSN): a unique serial number per disc
  Player ID (Blu-ray: Binding Device ID, HD-DVD: DUN): the player unique ID If the authorization server authorizes the user's player to unlock the title, the authorization server may send the following information back to the user's player:
  (PMSN, Player_ID) encrypted using the title key
  Encrypted Title Key Based on the information sent from the authorization server, the user's player then is given access to the protected movie content for playback.

However, most copy protection mechanism that implement remote unlocking of content, such as the AACS method above, employ an open correlation between information sent from a user's player to a remote authorization server and information sent from the remote authorization server to the user's player to obtain access to the disc's protected content. This open correlation can be exploited potentially giving users unauthorized access to protected content.

Consider an example, where a user using a first device or player to play back protected content may pay for authorization or otherwise obtain the keys or other unlocking information for unlocking the protected content for playback. Due to the open correlation discussed above, the user can then store the keys and unlocking information, making it available for subsequent unauthorized use by the user or other users because the user knows the correlation between information sent to a remote authorization server to unlock the content and the unlocking information returned. As a result, the same user or any number of different user can then unlock the same protected content with the stored information both using a second device or player that may not be authorized and/or without compensation to the content provider. Accordingly, the stored unlocking information can be re-used in an illegitimate, potentially malicious, and/or possibly illegal manner to enable unauthorized access to the protected content.

As transmissions between a user's player and the proper authorization server can be intercepted and/or redirected, due to the open correlation, the authorization process can be substantially altered. Furthermore, correct data for unlocking content may potentially be sent to a user's player without executing the actual transaction as envisioned by the content provider. For example, according to some HD formats, AACS protected content or other media assets can contain a manifest file in which a list of servers is stored. This server list may have between 2 and 26 server Uniform Resource Identifiers (URIs) identifying a server's address, such as using a Uniform Resource Locator (URL) or a Uniform Resource Number (URN). A potential way to hijack AACS protection of the content stored on the disc may be to intercept transmissions to one or more of the URIs in the list of servers.

The user having previously obtained authorization may merely modify routing of communications associated with another user or an unauthorized second device or player to an alternative server, such as one not listed in the URIs in the list of servers associated with the protected content. While the second device or player may send a request to one of the URIs in the list of servers associated with the protected content, the request may be redirected to the alternative server bypassing the established authorization process. Given the PMSN of an AACS protected title is embedded in the request intercepted from the second device or player, the alternative server can return a valid key encrypted with that PMSN. When the second device or player receives the encrypted key, the given title will be unlocked as normal.

In general, it can be very difficult or impossible for the second device or player to detect that any deviation from the normal unlocking process has occurred at this point. For the second device or player, this deviation may be the desired result of a user to unlock protected content without payment or authorization from the content provider. Additionally, this deviation may have a malicious outcome to take advantage of unsuspecting users, similar to pharming or phishing attacks used on the Internet.

Accordingly, in various embodiments, system 200 enables protected content to be distributed by content providers in such a manner to make the above deviations much more difficult. In one embodiment, the open correlation illustrated above and commonly associated with AACS between information sent to and from an authorization server may be removed by implementing secure remote content activation and/or unlocking wherein the correlation is known only to the authorization server. Thus, the likelihood is reduced or substantially eliminated that users (malicious or otherwise) can circumvent safe and designated authorization processes envisioned by content providers. Additionally, end users conscious of privacy may consider the process more protected since the user can consider system 200 as trusted.

Figure 3:
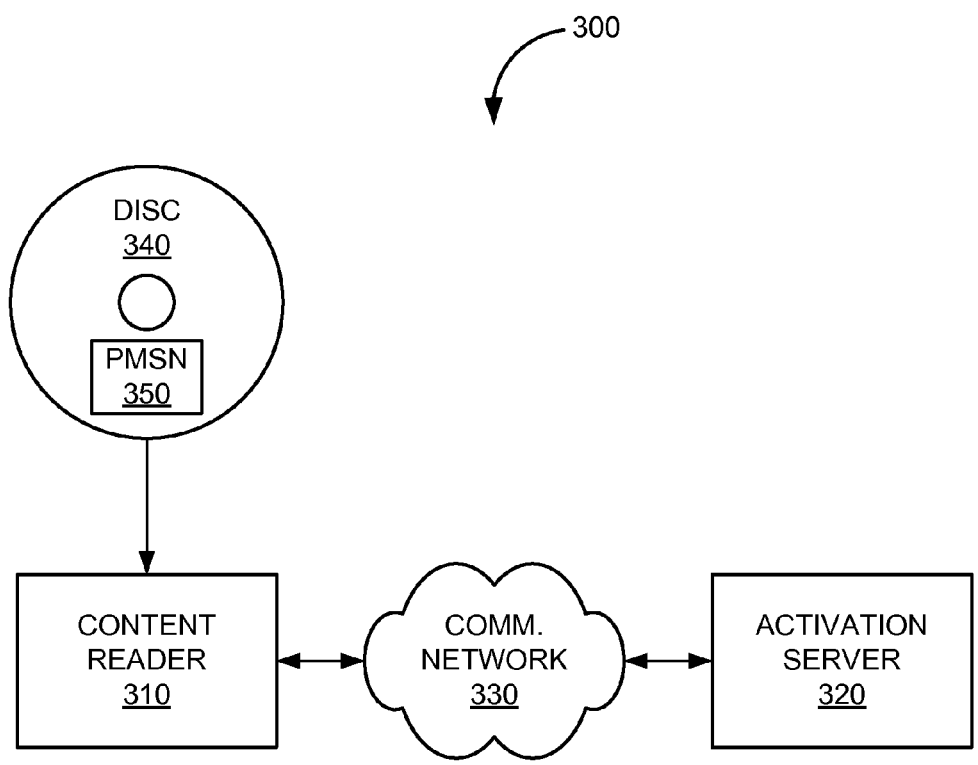
FIG. 3 is a block diagram of a system for providing secure remote unlocking of content in one embodiment according to the present invention.

FIG. 3 is a block diagram of system 300 for providing secure remote unlocking of content in one embodiment according to the present invention. In this example, system 300 can include content reader 310, activation server 320, and communications network 330. Content reader 310 may be communicatively coupled to activation server 320 via communications network 330.

Content reader 310 may be embodied as one of user devices 105 of FIG. 1. In various embodiments, content reader 310 can include a standalone HD-DVD or Blu-Ray disc player or HD-DVD or Blu-Ray disc player incorporated in a gaming device, such as a SONY PLAYSTATION 3 or MICROSOFT XBOX, and may receive protected content from a variety of sources. For example, content reader 310 may receive protected content via disc 340 as shown. In some embodiments disc 340 and/or its contents may be protected using AACS. Disc 340 may include PMSN 350. In general, PMSNs can be provided by content providers to manufacturers and distributors of protected content. Typically, PMSNs may be stored such that they are generally unavailable to the end user by accessible to devices compatible with AACS protected content. For example, PMSN 350 may be stored on a portion of disc 340 that is usually unreadable directly by a user, a user process, or user application associated with content reader 310, but that can be read by a system process or system application compatible with AACS.

In one example of operation, system 300 can provide secure remote content activation and/or unlocking of protected content, such as by building upon an authorization process used by AACS, by removing the open correlation between information sent seeking access to protected content and the unlocking information sent in return. As discussed previously, without this open correlation, it becomes more difficult for an attacker or other user to circumvent the distribution of unlocking information from authorized sources.

Figure 4:
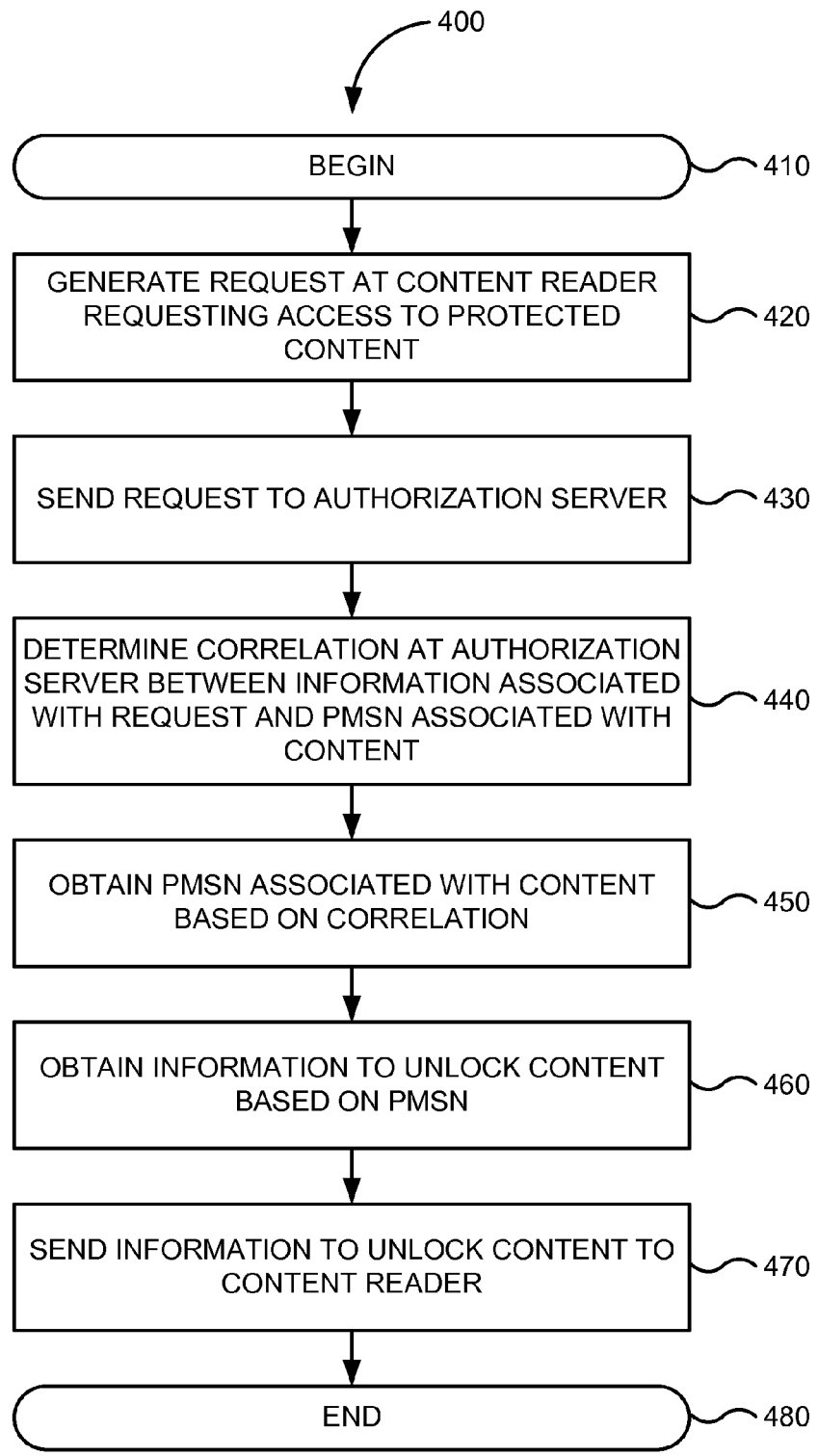
FIG. 4 is a flowchart of a method for secure remote unlocking of content in one embodiment according to the present invention.

FIG. 4 is a flowchart of method 400 for secure remote unlocking of content in one embodiment according to the present invention. The processing depicted in FIG. 4 may be performed by software modules (e.g., instructions or code) executed by a processor of a computer system or consumer electronic device, by hardware modules, or combinations thereof. FIG. 4 begins in step 410. The accompanying description may make reference to one or more elements system 300 of FIG. 3.

In step 420, a request is generated at a content reader (e.g., content reader 310 of FIG. 3) requesting access to protected content. For example, upon loading disc 350 into content reader 310, content reader 310 may attempt to access a portion of protected content stored on disc 350. Content reader 310 may generate the request based on a portion of content being marked as protected or its inability to read, interpret, or otherwise decode/decrypt the content.

In step 430, the request is sent to an authorization server (e.g., activation server 320). The request may be sent automatically via a communications network, such as the Internet, or using one or more mechanisms that involve a user, such as manually transferring the request to the authorization server. In some embodiments, the request may be communicated via one or more human or non-human intermediaries.

In step 440, a correlation is determined at the authorization server between information associated with the request and a pre-recorded serial number (PMSN) associated with the content. The correlation can include any mapping, function, transformation, or the like between information related to the request and the PMSN associated with the content.

In various embodiments, a function PMSN-G( ) can be defined as a combination function to generate a PMSN from two pieces of information, PMSN_A and PMSN_B. Symmetrically, this function has the following property as seen in equation (1):

$$PMSN\text{-}G^{-1}(PMSN) = PMSN\_A, PMSN\_B \quad (1)$$

In one example, PMSN_A and PMSN_B can include 4 numbers of m and n bits, respectively. In addition, PMSN_B may be defined as in equation (2) such that PMSN_B can be retrieved from PMSN_A using a function PMSN-E( ):

$$PMSN\_B = PMSN\text{-}E(PMSN\_A) \quad (2)$$

In step 450, the PMSN associated with the content is obtained at the authorization server based on the correlation. For example, the PMSN may be determined at activation server 320 from PMSN-G(PMSN_A, PMSN-E(PMSN_A)). In various embodiments, PMSN-G( ) may provide a non-algorithmic mapping to the corresponding PMSN further reducing or otherwise substantially eliminating any open correlation as discussed previously. This may be embodied as a lookup table. In some embodiments, PMSN-G( ) may provide an algorithmic determination of the corresponding PMSN.

In step 460, information to unlock the content is determined at the authorization server based on the PMSN. For example, activation server 320 may determine activation codes, encryption/decryption keys, digital signatures, or the like, that enable the content to be directly or indirectly unlocked. In step 470, the information to unlock the content is sent from the authorization server to the content reader. FIG. 4 ends in step 480.

Accordingly, PMSN-E( ) in the above example may be kept secret on the authorization server (e.g., activation server 320). Therefore, in various embodiments, system 300 may prevent PMSN-E( ) from being shared or otherwise exchanged to the end user or intercepting users during an authentication process of communicating information between content reader 310 and activation server 320. Thereby, the potential open correlations can be removed between information requesting access to protected content and information for unlocking the content received from an authorized unlocking server. As discussed above, system 300 can share a fraction of PMSN during the unlock process. In one embodiment, content reader 310 may send an unlock request to activation server 320 that may include {Title_ID, Volume_ID, PMSN_A, Player_ID}. PMSN_A may correspond to a fraction of the PMSN, such as the first n of m number of bits associated with PMSN. Thus, in the event that a malicious user gains access to PMSN_A, simply having possession of PMSN_A still fails to provide a user with enough information for the generation of the corresponding PMSN. Thus, system 300 can provide that even though a breach in one or more preexisting copy protection security processes may occur, and their associated keys become available publicly, the complete unlocking information required to access the protected content still may not be generated since PMSN-E( ) is unknown outside of activation server 320.

In various embodiments, aspects of secure remote content activation and/or unlocking may be implemented via one or more application programming interfaces (APIs) that interact with some kind of trusted core embedded in authorized devices. For example, content reader 310 of FIG. 3 may be embodied as an authorized content playback device with middleware that supports a Blu-ray Disc Java (BD-J) virtual machine, a BD+ special virtual machine, an HD-DVD ecmascript virtual machine, or the like. In general, BD-J can support Java ME "Xlets" for advanced content on Blu-ray Discs. BD-J may allow content on Blu-ray Disc titles to be far more sophisticated than bonus content provided by standard DVD, including such features as network access, picture-in-picture, and access to expanded local storage.

In various embodiments, invocation of BD-J Xlets may be triggered by events occurring around them, for example, by the selection of a movie title, or by the insertion of a new disc.

Xlets in turn can then call other Xlets into play. Security in BD-J can be based on the Java platform security model, enabling signed applications, for example, to perform more tasks than a non-signed application, such as Read/Write access to local storage, network access, selection of other titles on the BD-ROM disc, and control of other running BD-J applications. In one implementation, BD-J applications can use the java.net package to connect to servers (e.g., activation server 320).

The BD+ special virtual machine forms part of the Blu-ray Digital Rights Management System. BD+ typically includes a small virtual machine embedded in authorized players. BD+ may allow content providers to include executable programs on Blu-ray Discs. These programs may examine the host environment, to see if the player has been tampered with, verify that the player's keys have not been changed, execute native code, possibly to patch an otherwise insecure system, transform the audio and video output, or the like. In general, a program which can be found inside the BDSVM directory of a BD+ protected disc is called content code. The content code can be executed on a virtual big endian DLX-like processor. BD+ provides the content code with 25 system calls or "traps" which are used as the interfaces between the virtual machine and the content player.

For HD-DVD, Advanced Content can be used to provide interactive menus and "special features" such as additional bonus/extras content and games. The Advanced Content runtime engine is responsible for responding to user navigation input (e.g., from a remote control) as well as events set to occur during playback of a movie, controlling all actions and interactive properties during the playback of a movie. In general, Advanced Content can be written using the XML language and the ECMAScript language. Advanced Content applications can be very similar in structure to AJAX applications on the web, using a combination of script and markup in an asynchronous execution model. To support the ECMAScript code, Advanced Content defines a large number of objects, properties, and methods ("APIs") that are analogous to the DOM in a web browser; these APIs allow the script to query and control the player, animate the markup page, respond to user events, and connect to the Internet.

Figure 5:
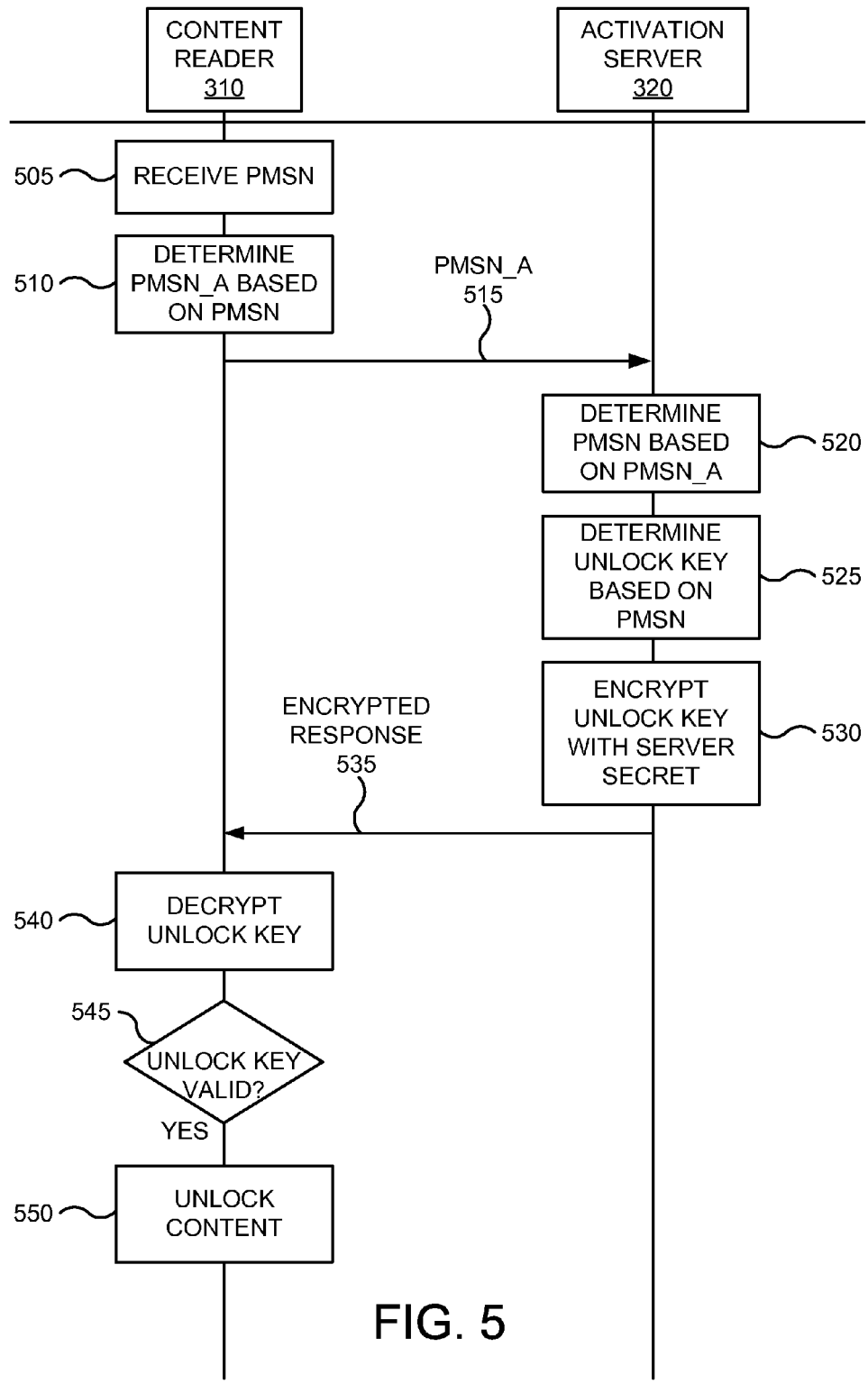
FIG. 5 is a message sequence chart illustrating secure remote unlocking of content in one embodiment according to the present invention.

FIG. 5 is a message sequence chart illustrating secure remote unlocking of content in one embodiment according to the present invention. Various aspects of secure remote content activation and/or unlocking performed by content reader 310 may be implemented via interactions using a Blu-ray Disc Java (BD-J) virtual machine, a BD+ special virtual machine, an HD-DVD ecmascript virtual machine, or the like. FIG. 5 begins in block 505.

In block 505, content reader 310 may receive a PMSN. For example, a software player executing on content reader 310 may interact with hardware and/or software elements associated with content reader 310 to receive PMSN 350 from disc 340. In various embodiments, PMSN 350 may be obtained by interacting with a virtual machine or BD middleware security APIs.

In block 510, content reader 310 determines PMSN_A based on the PMSN. For example, content reader 310 may determine PMSN_A 515 from PMSN-G$^{-1}$ (PMSN 350) as discussed above with respect to equation (1). PMSN_A 515 is then transmitted to activation server 320. Although only PMSN_A 515 is shown being transmitted from content reader 310 to activation server 320, other information may also be included.

In block 520, activation server 320 determines the PMSN based on PMSN_A. For example, activation server 320 can determine the PMSN using PMSN=PMSN-G(PMSN_A, PMSN-E(PMSN_A)). In various embodiments, PMSN-G( ) may provide a non-algorithmic mapping to the corresponding PMSN. This may be embodied as a lookup table, or any other random non-deterministic mapping. In some embodiments, PMSN-G( ) may provide an algorithmic determination of the corresponding PMSN.

Having the PMSN, in block 525, activation server 320 determines an unlock key associated with the protected content. The unlock key may be in encrypted or plain form at this point. Activation server 320 may generate additional unlock information, such as required by the AACS method or other copy protection mechanisms. For example, activation server 320 may encrypt data using the unlock key (e.g., a Title/CPS key) with a cipher-based message authentication code (CMAC) to generate a certificate. In general, CMAC can include a block cipher-based message authentication code algorithm, which may be used to provide assurance of the authenticity and, hence, the integrity of binary data. Activation server 320 may encrypt the PMSN using CMAC with the unlock key to generate the certificate to include the PMSN. Activation server 320 may further encrypt the Player_ID with the unlock key.

In block 530, activation server 320 encrypts the unlock key with a server secret. For example, activation server 320 may encrypt an encrypted title/CPS key using a function SERVER-E( ) and the PMSN to generate an encrypted response 535. Other information may be included in encrypted response 535. For example, encrypted response 535 may include the certificate and PMSN encrypted by an activation and/or unlocking server, such as SERVER-E ({CMAC(Kt,PMSN), CMAC(Kt,Player_ID), AES-G(Kvu, Kt)}, PMSN). Encrypted response 535 then may be sent to content reader 310.

In block 540, content reader 310 decrypts the unlock key. For example, using SERVER-E$^{-1}$( ), content reader 310 determines the unlock key and whether the unlocking information was recited from activation server 320 as an authorized server. In block 545, content reader 310 may determine whether the unlock key is valid. If the transaction is authorized, but the unlock key is wrong or otherwise invalid, an event or other indication may be triggered that the secure remote content activation and/or unlocking process of system 300 is under attack.

In block 550, if the unlock key is valid, content reader 310 unlocks the content to gain access. Content reader 310 may be given an unlock key that enables full or partial access, or one or more levels of restricted or unrestricted access. Access may further be based on time, data usage, content usage, ratings, or the like. FIG. 5 ends in block 550.

Figure 6A:
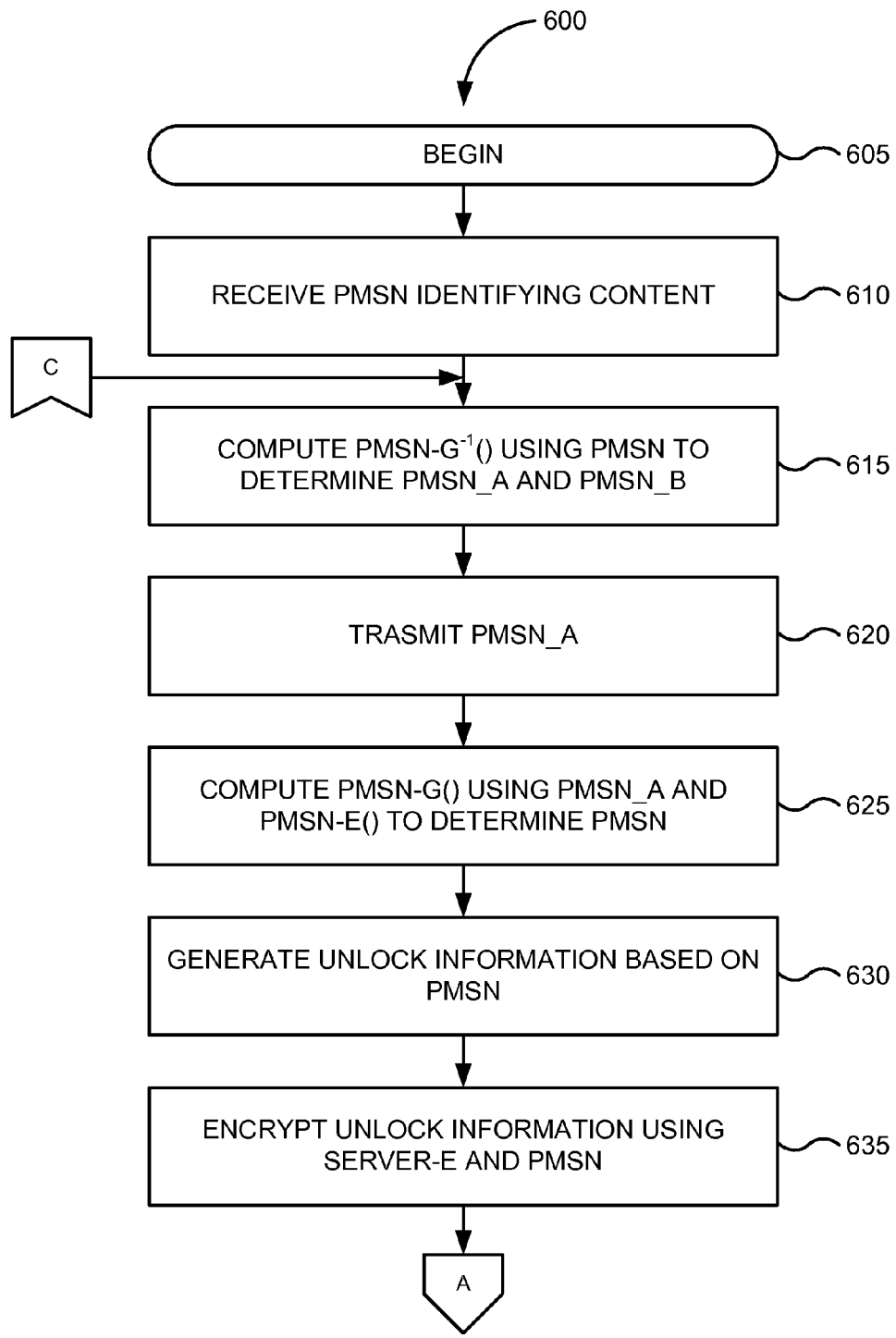
FIGS. 6A, 6B, and 6C are a flow chart of a method for secure remote unlocking of content in one embodiment according to the present invention.
Figure 6B:
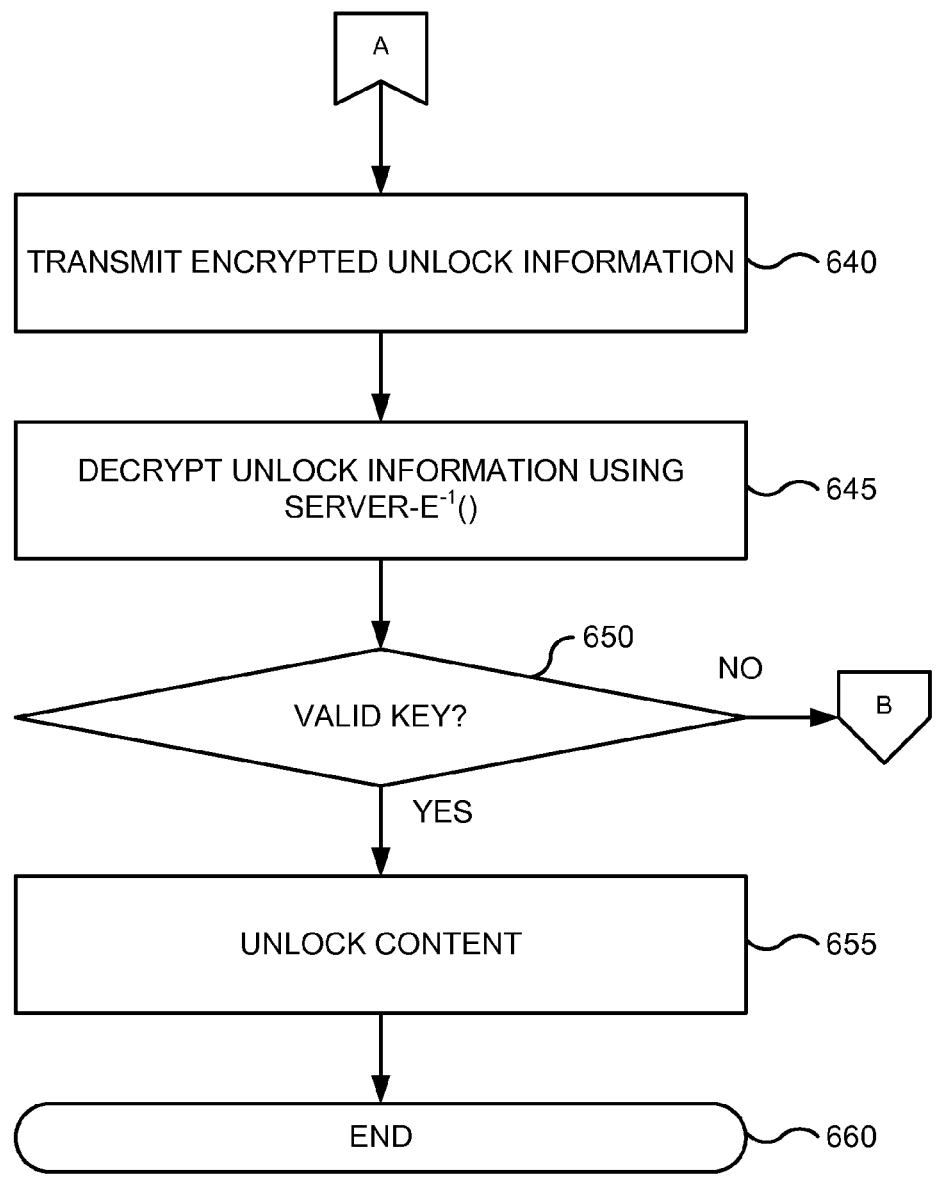
Figure 6C:
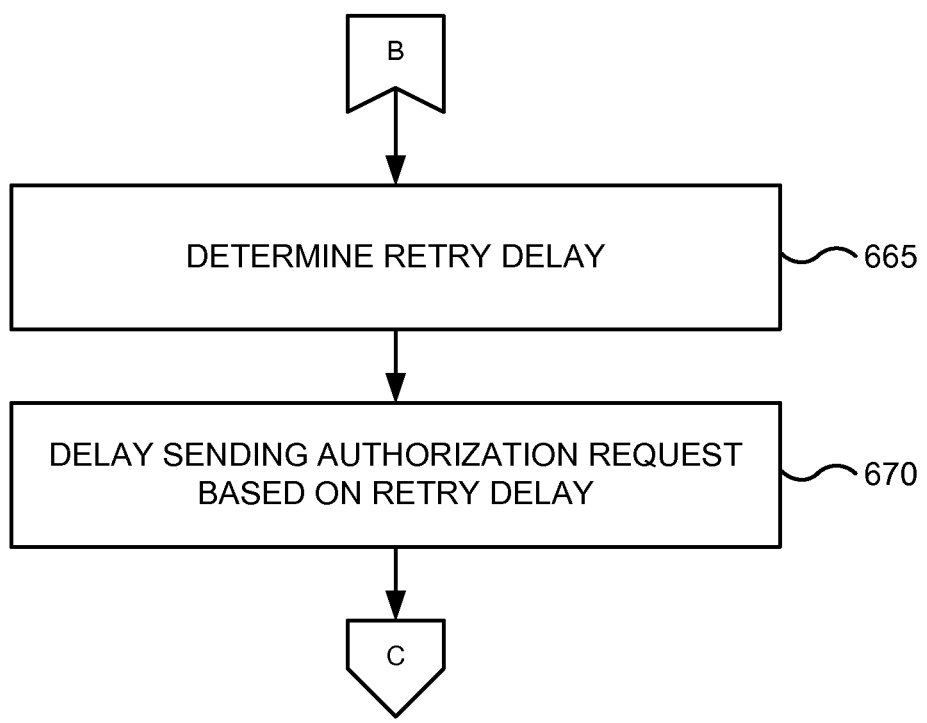

As illustrated above, PMSN-E( ) may be maintained as a secret on activation server 320. This can prevent an attacker from determining any correlation between information requesting the unlocking key, and the unlocking information itself. Thus, in various embodiments, system 300 may allow content providers to distribute protected content is a more secure manner, while allowing the convenience of secure remote content activation and/or unlocking FIGS. 6A, 6B, and 6C are a flow chart of method 600 for secure remote unlocking of content in one embodiment according to the present invention. The processing depicted in FIGS. 6A, 6B, and 6C may be performed by software modules (e.g., instructions or code) executed by a processor of a computer system, by hardware modules of the computer system, or combinations thereof. FIG. 6A begins in step 605.

In step 610, a PMSN is received identifying content. In step 615, PMSN-G$^{-1}$( ) is computed using the PMSN to determine at least PMSN_A and PMSN_B may also be computed. In step 620, PMSN_A is transmitted.

In step 625, PMSN-G( ) is computed using PMSN_A and PMSN-E( ) to determine the PMSN. In step 630, unlock information is generated based on the PMSN. In step 635, the unlock information is encrypted using SERVER-E( ) and the PMSN. The processing ends in step 635 of FIG. 6A and continues via block A in step 640 of FIG. 6B.

Referring now to FIG. 6B, in step 640, the encrypted unlock information is transmitted. In step 645, the encrypted unlock information is decrypted using SERVER-E$^{-1}$( ). In step 650, a determination is made whether the unlock information includes a valid key.

Based on a determination in step 650 that the unlock information includes a valid key, in step 655, the content is unlocked. The valid key may provide one or more levels of full or otherwise restricted access to protected content. The processing then ends in FIG. 6B in step 660.

Based on a determination in step 650 that the unlock information includes an invalid key, the processing ends in step 650 of FIG. 6B and continues via block B in step 665 of FIG. 6C.

Referring now to FIG. 6C, in step 665, a retry delay is determined. In step 670, resending of the authorization request is delayed based on the retry delay. In various embodiments, the delay may be determined exponentially such that each time an error occurs, a larger delay than the previous is experience. This allows an authorization system (e.g., system 300) to better react to brute force attack. The processing ends in FIG. 6C in step 670 and continues via block C in step 615 of FIG. 6A where the processing repeats as outlined.

Figure 7:
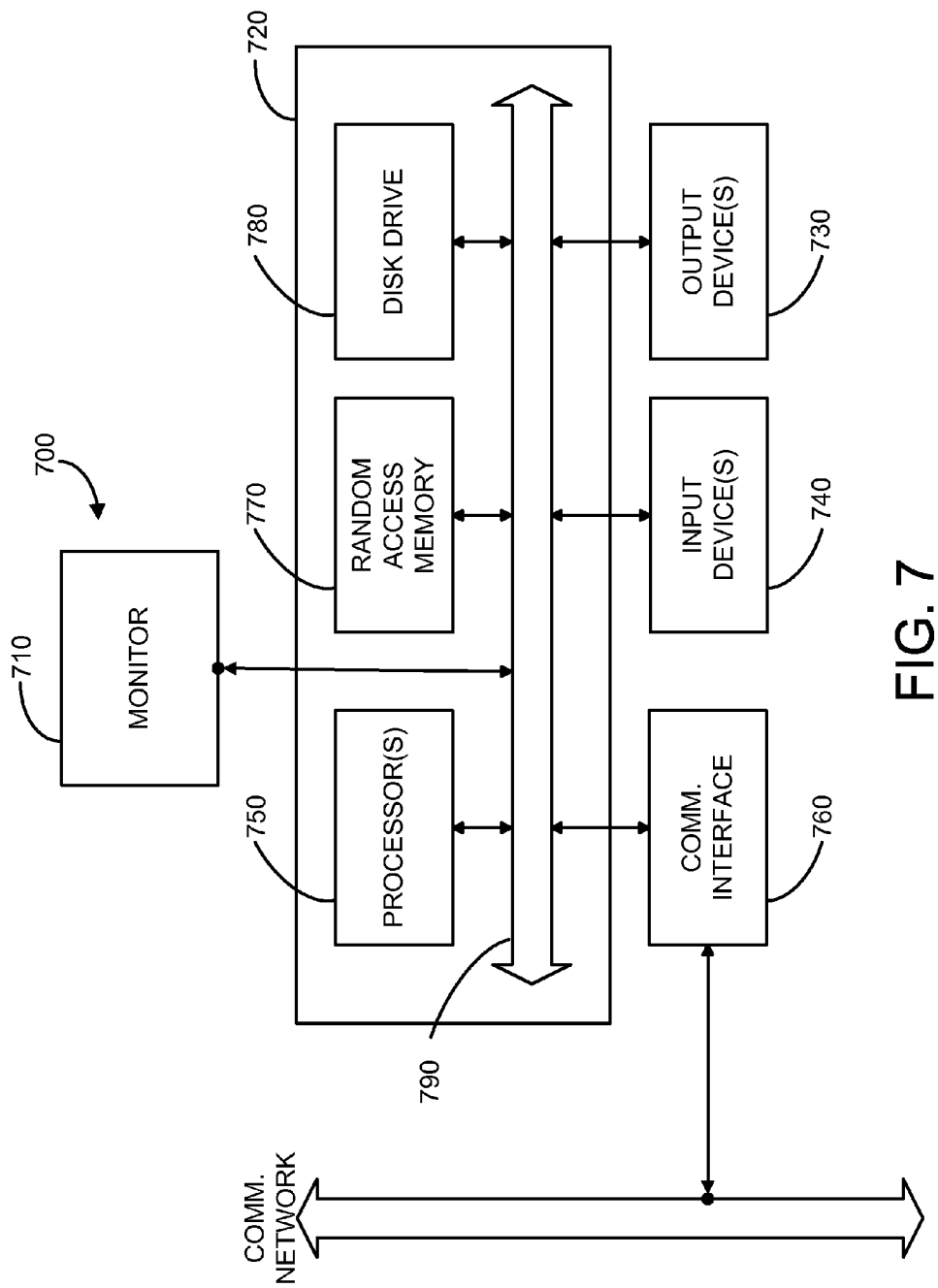
FIG. 7 is a block diagram of a system that may be used to practice embodiments of the present invention and/or may incorporate embodiments of the present invention.

FIG. 7 is a simplified block diagram of system 700 that may incorporate embodiments of the present invention. FIG. 7 is merely illustrative of an embodiment incorporating the present invention and does not limit the scope of the invention as recited in the claims. One of ordinary skill in the art would recognize other variations, modifications, and alternatives.

In one embodiment, system 700 typically includes monitor 710, electronic device 720, user output devices 730, user input devices 740, communications interface 750, and the like.

As shown in FIG. 7, electronic device 720 may include processor(s) 760 that communicates with a number of peripheral devices via bus subsystem 790. These peripheral devices may include user output devices 730, user input devices 740, communications interface 750, and a storage subsystem, such as random access memory (RAM) 770 and disk drive 780.

User input devices 730 can include all possible types of devices and mechanisms for inputting information to electronic device 720. These may include a keyboard, a keypad, a touch screen incorporated into a display, audio input devices such as voice recognition systems, microphones, and other types of input devices. In various embodiments, user input devices 730 can be typically embodied as a computer mouse, a trackball, a track pad, a joystick, wireless remote, drawing tablet, voice command system, eye tracking system, and the like. User input devices 730 typically allow a user to select objects, icons, text and the like that appear on monitor 710 via a command such as a click of a button or the like.

User output devices 740 can include all possible types of devices and mechanisms for outputting information from electronic device 720. These may include a display (e.g., monitor 710), a touch screen, non-visual displays, such as audio output devices, etc.

Communications interface 750 can provide an interface to other communication networks and devices. Communications interface 750 may serve as an interface for receiving data from and transmitting data to other systems. Embodiments of communications interface 750 may include an Ethernet card, a modem (telephone, satellite, cable, ISDN), (asynchronous) digital subscriber line (DSL) unit, FireWire interface, USB interface, and the like. For example, communications interface 750 may be coupled to a computer network, to a FireWire bus, or the like. In other embodiments, communications interfaces 750 may be physically integrated on the motherboard of electronic device 720, and may be a software program, such as soft DSL, or the like.

In various embodiments, system 700 may also include software that enables communications over a network such as the HTTP/HTTPS, TCP/IP, RTP/RTSP protocols, and the like. In alternative embodiments of the present invention, other communications software and transfer protocols may also be used, for example IPX, UDP or the like.

RAM 770 and disk drive 780 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 770 and disk drive 780 may be configured to store the basic programming and data constructs that provide the functionality of the present invention.

Software code modules and instructions that provide the functionality of the present invention may be stored in RAM 770 and disk drive 780. These software modules may be executed by processor(s) 760. RAM 770 and disk drive 780 may also provide a repository for storing data used in accordance with the present invention.

RAM 770 and disk drive 780 may include a number of memories including a main random access memory (RAM) for storage of instructions and data during program execution and a read only memory (ROM) in which fixed instructions are stored. RAM 770 and disk drive 780 may include a file storage subsystem providing persistent (non-volatile) storage for program and data files. RAM 770 and disk drive 780 may also include removable storage systems, such as removable flash memory.

Bus subsystem 790 provides a mechanism for letting the various components and subsystems of electronic device 720 communicate with each other as intended. Although bus subsystem 790 is shown schematically as a single bus, alternative embodiments of the bus subsystem may utilize multiple buses.

FIG. 7 is representative of a system capable of embodying the present invention. It will be readily apparent to one of ordinary skill in the art that many other hardware and software configurations are suitable for use with the present invention. For example, the system may include a consumer electronic device, optical disc player, digital video recorder, PC, desktop, portable, rack-mounted or tablet configuration. Additionally, the system may include a series of networked computers. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable storage medium as a set of instructions adapted to direct a processor of a computer system to perform a set of steps disclosed in embodiments of the present invention. The logic may be form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for remotely unlocking content protected by one or more copy protection mechanisms, the method comprising:
    at a content playback device, generating an unlock request, the unlock request including a first subset of bits of a unique identifier associated with the content and not including a second subset of bits of the unique identifier;
    transmitting, by the content playback device, the unlock request to an authorization server over a communication network;
    receiving, at the content playback device, a response from the authorization server over the communication network, the response including a key to unlock the content, wherein the response is generated by the authorization sever based on a reconstruction of the unique identifier using the first subset of bits associated therewith, and,
    unlocking the content using the key.

2. The method of claim 1, further comprising:
    before receiving the response from the authorization server, establishing an encrypted communication link over the communication network from the authorization server to the content playback device.

3. The method of claim 1, wherein the response from the authorization server is encrypted.

4. The method of claim 3, further comprising:
    decrypting the response from the authorization server.

5. The method of claim 1, wherein unlocking the content using the key comprises decrypting the content.

6. The method of claim 1, further comprising:
    determining whether the key is valid.

7. The method of claim 6, further comprising:
    based on a determination that the key is not valid, determining a delay to wait before re-transmitting, by the content playback device, the unlock request to the authorization server.

8. The method of claim 7, wherein the delay is based on an exponential function that is based on a number of times the determination that the key is not valid has occurred.

9. A content playback device, comprising:
    a content reader to receive a unique identifier and protected content, the protected content locked by one or more copy protection mechanisms;
    a communication interface to transmit an unlock request to an authorization server over a communication network, the unlock request including a first subset of bits of the unique identifier associated with the protected content and not including a second subset of bits of the unique identifier, the communication interface to receive a response from the authorization server over the communication network, the response including a key to unlock the protected content, wherein the response is to be generated by the authorization sever based on a reconstruction of the unique identifier using the first subset of bits associated therewith, and,
    a processor to unlock the protected content using the key.

10. The content playback device of claim 9, wherein before receiving the response from the authorization server, the content playback device is to establish an encrypted communication link over the communication network from the authorization server to the content playback device.

11. The content playback device of claim 9, wherein the response from the authorization server is to be encrypted.

12. The content playback device of claim 11, wherein the content playback device is to decrypt the response from the authorization server.

13. The content playback device of claim 9, wherein unlocking the content using the key comprises decrypting the content.

14. The content playback device of claim 9, wherein the content playback device is to determine whether the key is valid.

15. The content playback device of claim 14, wherein the content playback device is to determine a delay to wait before re-transmitting another unlock request to the authorization server.

16. The content playback device of claim 14, wherein the delay is to be based on an exponential function that is based on a number of times invalid keys are received.

17. A method for authorizing the remote unlocking of content protected by one or more copy protection mechanisms, the method comprising:
    at an authorization server, receiving, from a content playback device via a communication network, an unlock request generated by the content playback device, the unlock request including a first subset of bits of a unique identifier associated with the content and not including a second subset of bits of the unique identifier; and,
    transmitting, by authorization server to the content playback device, a response over the communication network that enables the content playback device to unlock the content using a key, the response including the key to unlock the content, wherein the response is generated based on a reconstruction of the unique identifier using the first subset of bits associated therewith.

18. The method of claim 17, further comprising:
    before transmitting the response to the content playback device, establishing an encrypted communication link over the communication network from the authorization server to the content playback device.

19. The method of claim 17, wherein the response is encrypted.

20. The method of claim 19, wherein the content playback device is enabled to unlock the content using the key by decrypting the response from the authorization server.

* * * * *